Feb. 27, 1934.                J. BIJUR                1,948,502
                          CHASSIS LUBRICATION
                       Original Filed Nov. 1, 1928

INVENTOR
Joseph Bijur.
BY
Dean, Fairbank, Obrighter Hirsch
ATTORNEYS

Patented Feb. 27, 1934

1,948,502

UNITED STATES PATENT OFFICE 1,948,502

CHASSIS LUBRICATION

Joseph Bijur, New York, N. Y., assignor to Auto Research Corporation, a corporation of Delaware Application November 1, 1928, Serial No. 316,385
Renewed November 12, 1931

12 Claims. (Cl. 184—7)

My present invention relates primarily to installations for transmitting fluid or fluid pressure between the frame and a part movable relative thereto, such as an axle, or axles of a vehicle, and is shown embodied in means for conveying lubricant from a point of control on the chassis frame to bearings associated with an axle of a motor vehicle.

The conduit element through which fluid or pressure is transmitted between the chassis frame and the axle should accommodate the relative movement of these parts, which occurs as the springs flex during travel of the vehicle. My invention has among its objects to provide a serviceable conduit of small diameter and low cost, which is easy to install on any of a wide variety of vehicles without reorganization of the vehicle construction, which provides the required yield or flexibility where flexure should occur, yet is not subject to whipping, which remains tight even for relatively high fluid pressure, and which is substantially proof against rupture or leak from vibration of the moving vehicle even in hard usage. My invention provides a conduit in the above relation, which has no exposed unprotected parts likely to be bent or broken off by the usual impacts encountered in ordinary usage, which is inconspicuous and which, while accommodating the motion of the axle without undue strain at any part of the conduit, is nevertheless mechanically so strong and is retained in place upon the vehicle structure so securely as not to be torn loose by the driving of the vehicle through brush or bushes, which will suffer no substantial injury from pelting by ice or loose stones, that may be thrown up from the road by the movement of the vehicle thereon, which will not be torn off or damaged by mud frozen thereon, and which will not be disturbed by handling as by removing mud in cleaning the vehicle.

The present application is a continuation in part of that of my earlier application, Serial No. 627,953, filed March 27, 1923.

Figure 1:
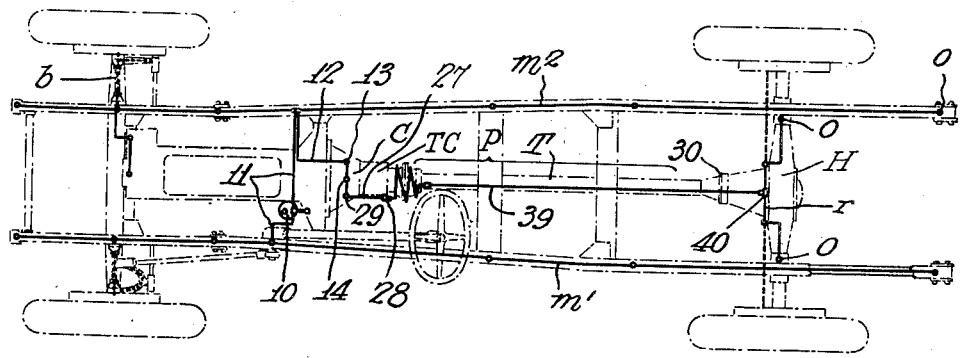
Figure 2:
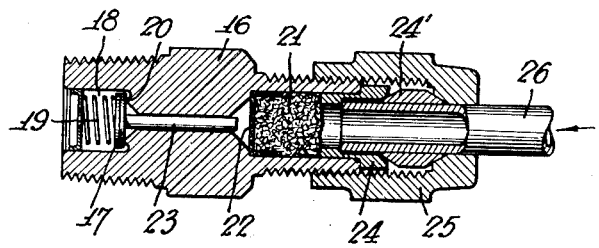
Figure 3:
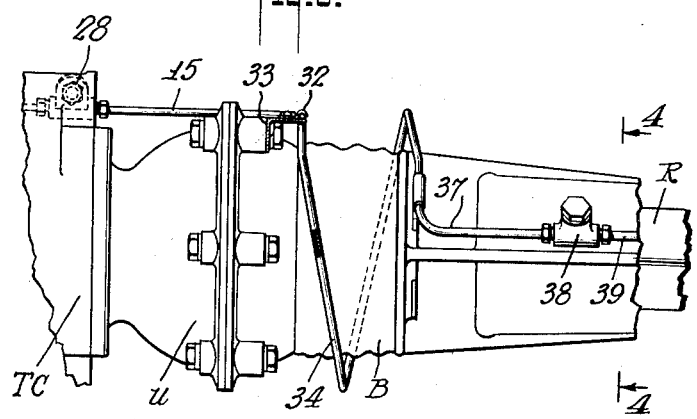
Figure 4:
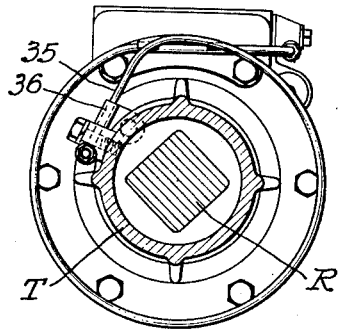

In the accompanying drawing in which is shown one of various possible embodiments of the several features of the invention, Fig. 1 is a plan view of an automobile chassis indicating diagrammatically the lubricating installation, Fig. 2 is a sectional view on an enlarged scale indicating one embodiment of drip plug outlet which may be used on the central system with which the invention is concerned, Fig. 3 is a fragmentary plan view on a larger scale showing the flexible conduit, and Fig. 4 is a sectional view taken on line 4—4 of Fig. 3.

Referring now to the drawing, Fig. 1 shows a source of lubricant 10 which may be manually or automatically operable to discharge through the conduit system. The system includes a transverse run 11, communicating at its ends with mains $m'$ and $m^2$ which feed through various outlets O to the spring bolt and shackle bearings. Illustratively the bearings of the front axle are lubricated through ducts in the front wheel brake construction B, the details of which are not disclosed and are not material to the present invention. Such front wheel brake construction is shown and claimed, for instance, in my British Patent No. 235,687, of Apr. 30, 1924.

A transverse conduit 12 leads from one of the mains to the top of the clutch case C and carries outlets 13 and 29 for lubrication of the clutch release bearing shaft, and an outlet 14 for the clutch throw-out bearing. The branch outlet 29 of conduit 12 communicates with a conduit 27 extending along the transmission case and connected by a suitable junction piece 28 to a conduit P to be below more fully described, which leads along the torque tube T to the rear axle.

In a preferred application, the distribution of lubricant to the various bearings is controlled by flow governing elements preferably located at or near the respective bearings or outlets O thereto. Any of a wide variety of such flow control elements may be employed, including the drip plug disclosed and claimed in my prior Patent #1,632,772 of June 14, 1927. In Fig. 2 one such drip plug is illustratively shown, but since this is not a part of the invention claimed herein, it need be but briefly described. The drip plug includes a fitting 16 having a disk valve 17 in a socket 18 at one end thereof and urged by a spring 19 against a valve seat 20. The opposite or inlet end of the fitting houses a plug 21 of wool felt with a backing cup 22 of wire mesh. Between the valve and the felt plug is lodged a restriction pin 23 of accurately predetermined diameter nearly filling a corresponding accurately gauged bore, longitudinally of the fitting. The pipe extremity is connected to the inlet end of the fitting by means of a compression coupling comprising a sleeve 24' reacting against a hardened steel bushing 24 press-fitted into the fitting and tightened by a bushing 25 threaded over the end of the fitting. The compressive effect of bushing 25 causes bushing 24 to wedge collar 23 inward against the feed pipe extremity 26, for tight engagement thereof.

Drip plugs 16 similar to that described, each of appropriate rating, are disposed at the outlets O in the pipe line 12 along the rear axle. The conduit that supplies the rear axle must be lubricant-tight under the pressure transmitted therethrough to force oil through the drip plugs and yet it must have sufficient flexibility to accommodate the movement of the rear axle relative to the frame.

I have shown the application of my conduit to a specific construction in wide use. This construction includes a torque tube T encircling the propeller shaft R and secured at 30 at its rear end to the differential housing H. The propeller shaft is connected at its forward end to a universal joint (not shown) within the fixed universal joint housing u affixed to the rear of the transmission case TC. The forward end of the torque tube is mounted for relatively free movement and the gap between the universal joint and said tube is closed by a flexible boot B of leather or the like which excludes dust and grit and accommodates the pivoting movement of the forward end of the tube under the vibration in use.

My conduit P includes a length 15 of seamless pipe preferably connected to junction 28 and clipped at 32 to a bracket 33 on the universal casing u and curved as a helix 34 preferably through one complete turn about the boot. The turn of the helix is bent inward as at 35 and is secured by means of an encircling clip 36 to the extremity of the torque tube T from which the extremity of the tube is bent to extend longitudinally of said housing as at 37. The extremity 37 is coupled by means of a fitting 38 to a pipe length 39 which is clipped longitudinally to the tube T and is connected by a T fitting 40 at its rear end to the conduit r along the rear axle. The helical length 34 is of hard brass or other resilient metal to accommodate the hinging movement of the torque tube. The length 39 may be of copper or other non-resilient material since it moves as a unit with the rigid torque tube.

By the construction described, it will be understood that the up and down movement, as well as the rocking movement of the rear axle relative to the frame are effected without destructive strain on the conduit 15—39 all of these movements being readily accommodated by the helical turn 34 thereof.

While I have shown the lubricant conveyed to and along the torque tube, it will be understood that the invention is not limited to such specific application.

It will be noted that while my flexible conduit accommodates all the movements of the axle relative to the frame, yet the conduit will not whip or lash in use and is rigid from end to end without swivels or other loose connections for accommodating relative movements.

I claim:

1. In a central chassis lubricating system means for conveying lubricant pressure from the chassis frame to the rear axle, said means including a flexible metal pipe extending in helical conformation adjacent the forward part of the propeller rod to accommodate the pivoting movement thereof at said region and extending therefrom longitudinally along the propeller rod to the rear axle, and means sustaining the length of said pipe free from engagement with the revolving propeller rod.

2. In a central chassis lubricating system, means for conveying lubricant pressure from chassis frame to rear axle, said means including a flexible metal pipe extending in a single turn about the forward part of the propeller rod to accommodate the pivoting movement thereof at said region and extending therefrom longitudinally along the propeller rod to the rear axle, and means sustaining the length of said pipe free from engagement with the revolving propeller rod.

3. In a motor vehicle of the type including structural parts having a hinging connection to accommodate relative movement, means for conveying lubricant from one to the other of said parts, past said hinging connection, said means including a length of pipe having a portion thereof encircling and enclosing said hinging connection, and anchored at its opposite ends near said connection, to the respective structural parts.

4. In a motor vehicle of the type including structural parts having a universal connection to accommodate relative movement, means for conveying lubricant from one to the other of said parts, past said universal connection, said means including a length of pipe having a portion thereof encircling said universal connection, and anchored at its opposite ends near said connection, to the respective structural parts.

5. In a motor vehicle of the type including a propeller shaft having a universal-joint driving connection with the transmission at the forward end thereof, a torque tube about said shaft, an enclosure for said joint and a flexible boot between the forward end of the tube and said enclosure; the combination therewith of a flexible liquid-tight conduit extending from the frame to the rear axle, said conduit including a helical turn encircling said boot, fixed at its outer end near the outer periphery of the enclosure and having its opposite end extending inward and fixed thereat to the forward extremity of the torque tube.

6. In a motor vehicle of the type including a propeller shaft having a universal-joint driving connection at the forward end thereof, a torque tube about said shaft, an enclosure for said joint, and a flexible boot between the forward end of said tube and said enclosure; the combination therewith of means for conveying liquid pressure from the frame to the rear axle, said means comprising a liquid-tight flexible conduit extending lengthwise of the torque tube, and including a helical turn about the boot, fixed near one end with respect to the enclosure and at the other with respect to the torque tube.

7. In a motor vehicle of the type including a propeller rod having an enclosing torque tube secured at its rear end to the differential case, an enclosed universal joint at the forward end of said propeller rod, and a flexible boot closing the gap between the tube and the joint; the combination therewith of metal tubing for conveying lubricant from the frame to the rear axle, said means including a helical turn of resilient metal tubing encircling said boot, means clipping one end of said turn with respect to the universal joint enclosure and the other end with respect to the torque tube and a tubing length of more plastic metal extending along said torque tube and coupled to the outlet end of said helical turn.

8. In a motor vehicle of the type including a propeller shaft having a universal joint driving connection at the forward end thereof, a torque tube about said shaft, an enclosure for said joint and a flexible boot between the forward end of said tube and said enclosure; the combination therewith of means for conveying liquid pressure from the frame to the rear axle, said means comprising a length of metal tube affixed along a part associated with the engine and having an outlet substantially at the transmission case, a length of pipe extending along the torque tube and having an inlet adjacent the forward end thereof, and a liquid-tight flexible conduit of resilient metal including a turn about the boot, connected at its inlet end to the outlet of the first conduit and at its outlet to the inlet of the second conduit.

9. In a mechanism of the type having relatively moving structures one of which carries bearings to be lubricated and a shaft therebetween having a jointed connection to the other structure; the combination therewith of a lubricating installation comprising a lubricant source on the other structure, a lubricant conduit system on the bearing carrying structure and means for conveying lubricant from the source-carrying structure to the bearing-carrying structure, said means comprising a conduit extending lengthwise of the shaft and including a helical turn enclosing said joint.

10. In a motor vehicle of the type including a chassis frame, an axle and a shaft extending from the chassis frame to the axle, said shaft having a universal joint driving connection at the forward end thereof; the combination therewith of a lubricating installation comprising a conduit system associated with the axle, a lubricant source on the chassis frame and means for conveying lubricant from the lubricant source to the conduit system, said means including a length of pipe extending along the shaft and having an inlet adjacent the forward end thereof, and a liquid tight flexible conduit of resilient metal including a turn encircling said universal joint.

11. In a lubricating installation for a motor vehicle having a frame, a rear axle, springs interposed between said frame and said axle, longitudinally extending structural means connected to said rear axle, a conduit for conveying lubricant from said frame to a bearing upon said rear axle, said conduit comprising a pipe line upon said frame and extending along one of said longitudinal structural elements to said rear axle, and along saiu rear axle to said bearing, said pipe line having an integral helically formed portion forming a yielding bridging connection near one end of said structural element.

12. In a lubricating installation for a motor vehicle having a frame, a transmission thereon, a rear axle, springs interposed between said frame and said axle, a torque tube connected to said rear axle, a universal joint connecting the forward end of said torque tube to the transmission, a conduit for conveying lubricant from said frame to a bearing upon said rear axle, said conduit comprising a pipe line upon said frame, and extending along said torque tube and along said rear axle to said bearing, said pipe line being of helical form at the bridging portion thereof near said universal joint between said transmission and the forward end of said torque tube.

JOSEPH BIJUR.